United States Patent Office 3,326,430
Patented June 20, 1967

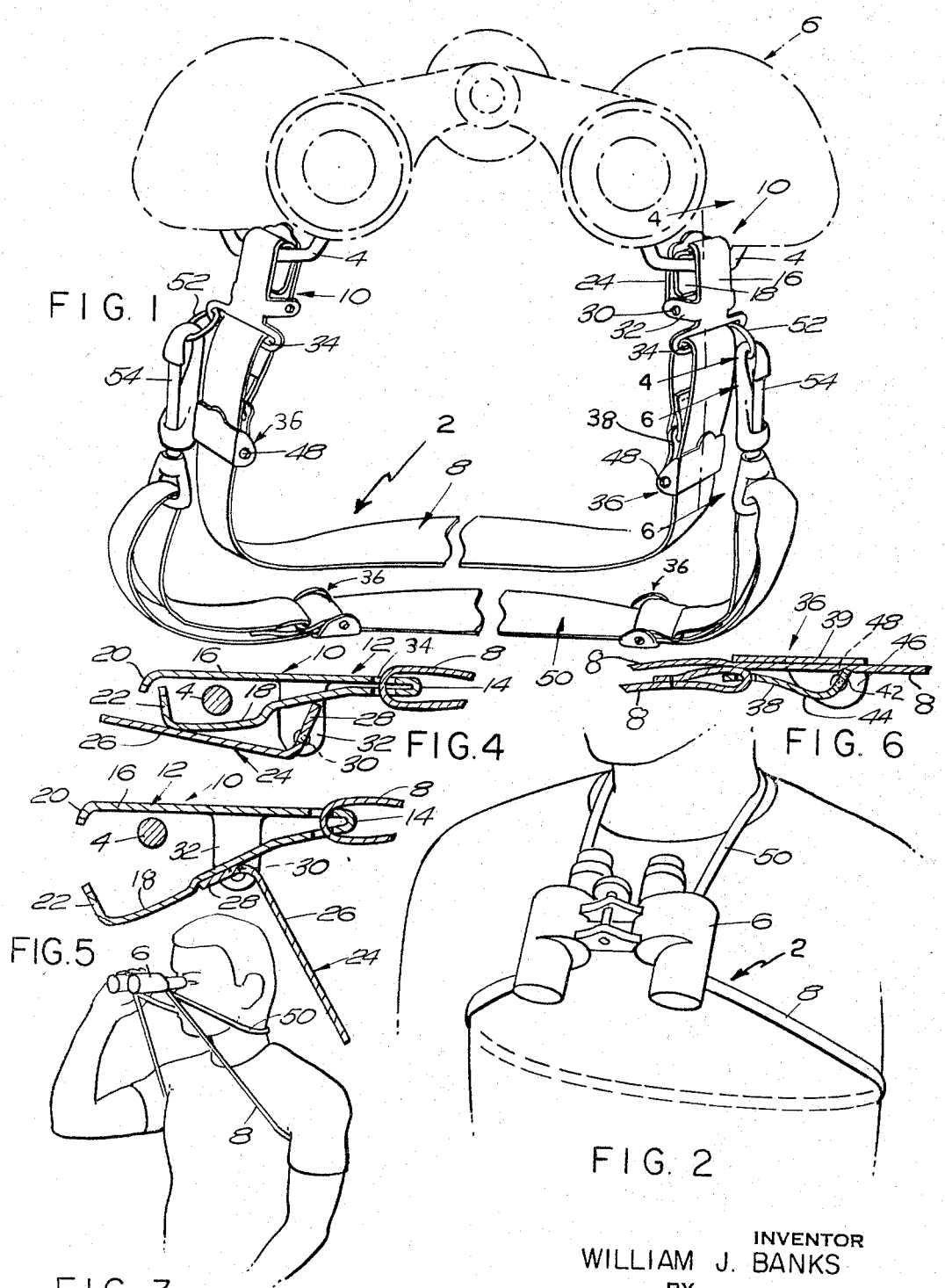

3,326,430
HARNESS
William J. Banks, Plainfield, N.H.
(R.F.D. 2, Windsor, Vt. 05089)
Filed Jan. 22, 1965, Ser. No. 427,351
2 Claims. (Cl. 224—5)

The present invention relates to an improved and novel harness for carrying binoculars, a camera or the like.

It is an object of this invention to provide such a harness of elastic material for holding the binoculars or camera firmly but yieldably against the upper chest out of the way of the wearer so that they do not swing or otherwise hamper the wearer. Consequently, the wearer can participate in whatever activities he wishes without interference from the binoculars or camera. On the other hand, the construction of the harness permits the wearer to easily move the binoculars or camera to his eyes or other face area with only one hand when he wishes to use them without detaching the binoculars or camera from the harness and without any other manipulations except to simply grip the binoculars or camera with one hand and move them to the position desired. After use, it is necessary only to move the binoculars or camera back to the chest without any other other movement or manipulation and they remain there out of the way snugly against the chest. In fact, after use, it is necessary only to release the binoculars or camera with nothing more and they return to their position against the chest.

It is another object of the invention to provide a harness for binoculars, a camera or the like whereby the binoculars or camera can be comfortably worn without hampering the activity of the wearer and can be used with a minimum of effort and without danger of accidently dropping them and thereby damaging them or of misplacing or losing them.

These objects are achieved in accordance with the present invention by providing a harness with an adjustable back strap of elastic material, preferably a strip of elastic fabric, having at its ends means for detachably attaching the same to the binoculars or camera. The back strap is adapted to extend snugly under the armpits and around the back of the wearer to hold the binoculars or camera snugly but yieldably against the chest. The harness also includes a neck loop of elastic material, preferably a strip of elastic fabric, attached at its ends to the means for detachably attaching the back strap to the binoculars or camera. The neck loop is adapted to extend snugly around the back of the neck of the wearer to hold the binoculars or camera snugly but yieldably against the upper part of the chest out of the way of the wearer when not in use. The elasticity of the back strap and neck loop are sufficient to permit the binoculars or camera to be easily moved from the upper part of the chest to the eyes or other part of the face with only one hand merely by stretching the back strap and neck loop. Upon completion of use and release thereof, the elastic strap and loop will return the binoculars or camera to their positions snugly against the upper chest.

Other objects and advantages of the invention will be apparent from the following description and accompanying drawings describing and showing for illustrative purposes only a preferred embodiment of the invention.

In the drawings:

FIG. 1 is a view in perspective of a harness embodying the present invention detachably attached to a pair of binoculars;

FIG. 2 is a view in perspective of the harness and binoculars of FIG. 1 as worn by the wearer;

FIG. 3 is a view of the harness and binoculars of FIG. 1 with the binoculars in use and held by one hand to the eyes;

FIG. 4 is a section taken along the line 4—4 of FIG. 1 showing the means for detachably attaching the harness to the binoculars;

FIG. 5 is a view like FIG. 4 with the detachable attaching means released for removal of the harness from the binoculars;

FIG. 6 is a section taken along the line 6—6 of FIG. 1 showing the means for adjusting the size of the harness.

Referring to the figures, 2 represents the harness embodying the invention and attached to the lugs 4 of binoculars 6.

The harness 2 comprises a back strap or band 8 of elastic fabric, the ends of which are detachably attached to the lugs 4 of the binoculars by means of the clips 10. The elastic fabric may comprise lengths of elastics or elastic threads extending in the longitudinal direction of the strap and interwoven into the form of a fabric with elastic or non-elastic (textile) cross threads.

Each clip 10 (FIG. 4) comprises a strip of spring metal 12 bent back on itself at 14 to form a pair of jaws 16 and 18 having inturned, serrated edges 20 and 22, respectively and normally biased away from each other by the resiliency of the strip 12. The jaws 16 and 18 are forced toward each other to lock position, as shown in FIG. 4, by means of a cam lever 24 having an elongated arm 26 and a shorter cam arm 28. Cam lever 24 is pivotally attached at its sides by integral pintles 30 to a pair of flat parallel lugs 32 extending downwardly and integrally from the jaw 16, as shown in FIGS. 4 and 5, and having holes for receiving the pintles. When the cam lever 24 is rotated clockwise to the lock position, shown in FIG. 4, the short cam arm 28 engages the jaw 18, as shown in FIG. 4, to force the jaw 18 toward the jaw 16 into lock position, as shown, in which position the lug 4 is locked between the jaws 16 and 18. Lug 4 may be released by rotating the cam lever 24 counterclockwise to the position shown in FIG. 5, whereby the jaws move away from each other, as shown, thereby permitting the clip to be detached from lug 4. The jaws 16 and 18 have a pair of aligned slits 34 close to bend 14 for receiving the elastic strap 8, as shown.

The effective length of the strap 8 can be adjusted by means of the adjustable clamps 36, each of which comprises a metallic member 39 and a cooperating metallic lever member 38 pivotally attached thereto. The strap 8 passes between the two members 38 and 39, as shown. Lever member 38 has a bend connecting a short serrated arm 42 and a longer arm 44 to the latter of which is attached an end of the strap 8, as shown. The end of the strap passes through a slot at the end portion of lever member 38 and is folded back on itself and stitched, as shown. Lever member 38 is pivotally attached to and within a pair of downwardly extending parallel walls 46 of member 39 by means of pintles 48 at the sides of member 38 and extending outwardly into holes in walls 46. When the lever member 38 is in the position shown in FIG. 6 the serrated edge of arm 42 clamps the strap 8 between itself and the member 39, as shown. To adjust the length of the strap the lever member 38 is rotated counterclockwise, as shown in FIG. 6, to move the serrated edge away from the strap 8 and thereby release the strap, whereby the clamp 36 can be moved along the strap 8 to adjust the effective length of the strap.

The harness also comprises an adjustable neck loop or strap or band 50 also of elastic fabric material of the same kind as strap 8 and the ends of which are detachably attached to the clips 10 by means of rings 52 and conventional clips 54. Neck loop 50 is provided with adjustment clamps 36 for adjusting the effective length thereof. If desired, the ends of neck loop 50 can be attached directly to the lugs 4 of the binoculars, or the neck loop 50 can be provided with the clips 10 and the ends of strap 8 connected to such clips in the same manner that the ends of loop 50 are attached to such clips in the drawing. When it is stated herein that the ends of the back strap are attached to the binoculars by such clips, i.e., means for detachably attaching the ends of the back strap to the binoculars, and the ends of the neck loop are attached to the clips, it is intended to include all of these embodiments.

When worn, the strap 8 extends under the armpits and around the back of the wearer, as shown in FIG. 2, the length of the strap being such that it holds the binoculars snugly but yieldably against the chest of the wearer. The neck loop 50 extends around the back of the neck of the wearer and the length thereof is such as to hold the binoculars snugly but yieldably against the upper chest well out of the way of the wearer. The height of the binoculars on the chest can be adjusted by adjusting the effective length of the neck loop.

It is apparent that with the binoculars so held, the wearer can proceed with any activity he wishes without swinging of the binoculars and without the binoculars getting into his way, i.e., the binoculars do not hamper him in any way.

When he wishes to use the binoculars he need only grip them with one hand and move them to his eyes, as shown in FIG. 3, by stretching the strap 8 and loop 50. His other hand remains free. It is not necessary to detach the binoculars from the harness or the harness from the body. No manipulations other than grasping the binoculars with one hand and moving them to the eyes, are necessary. After use and upon release of the binoculars they return to their position shown in FIG. 2 snugly against the upper chest and out of the way with no manipulations being necessary.

It is apparent that with the harness construction of the invention, the dangers of dropping the binoculars or of misplacing them or of losing them are avoided. If the binoculars fall from the hand of the user they merely return to their position against the chest with no harm done. With conventional harnesses, either the binoculars hamper the activities of the wearer or it is necessary to remove the binoculars from the harness or the harness from the body in order to use them. The disadvantages of the former are obvious. The chief disadvantage of the latter is that it requires both hands and considerable effort. Also, the danger of dropping or misplacing the binoculars is increased.

It is also apparent that the harness of the present invention is particularly useful for military purposes, for hiking, for mountain climbing, etc., where it is essential that the binoculars shall not hamper the activities of the wearer but that they can be used swiftly with a minimum of effort and manipulation.

Important advantages of the harness of the present invention are its extreme simplicity and its low cost as well as the simplicity with which it can be applied and removed from the body of the wearer and the comfort with which it can be worn. It does not embody coil springs or housings therefor which increase the cost and complexity of the harness substantially. Furthermore, coil springs have the disadvantage of being uncomfortable and of catching in the clothing of the wearer or pinching the skin when exposed. Housings are required to house the springs at least when they are retracted, which housings further complicate and add bulk to the harness. Also, coil springs are more subject to mechanical failure and fatigue than elastic bands.

Another advantage of the harness of the present invention is that it can be easily applied and removed from under heavy outer garments without removal of the outer garments. This is particularly advantageous for outdoor use in cold climates.

Still another advantage is that tension in the harness holds the binoculars, camera or the like from four directions. The resultant holding force holds the binoculars, camera or the like in an adjustable and comfortable position on the chest, i.e., not too close to the neck and not too far down on the chest.

I claim:

1. A harness for carrying binoculars, a camera or the like snugly against the chest of the wearer, comprising:

an adjustable elastic back strap having clips at its ends for detachably attaching said back strap to said binoculars, camera or the like at points on opposite sides of the center thereof and adapted to extend snugly under the armpits and around the back of the wearer to hold said binoculars, camera or the like snugly against the chest, said harness also including an elastic neck loop having clips on the ends thereof detachably attached directly to said back strap clips, said neck loop being adapted to extend snugly around the back of the neck of the wearer to hold said binoculars, camera or the like snugly against the upper part of the chest out of the way of the wearer when not in use, the elasticity of said back strap and neck loop being sufficient so that when said binoculars, camera or the like are to be used they can be moved to the face by stretching said back strap and neck loop, whereby upon completion of use thereof, the elastic back strap and neck loop will return them to their position snugly against the upper chest.

2. The structure of claim 1, wherein said back strap and neck loop comprise individual strips of elastic fabrics.

References Cited

UNITED STATES PATENTS

| 171,961 | 1/1876 | Smith | 24—258 |
| 1,846,846 | 2/1932 | Coffman | 224—5 |
| 1,865,353 | 6/1932 | Brewster | 224—5 |
| 2,643,803 | 6/1953 | Bates | 224—5.24 |
| 2,711,122 | 6/1955 | Klumpp | 224—5.22 |
| 3,152,738 | 10/1964 | Worsfold | 224—5.22 |

FOREIGN PATENTS

| 245,405 | 3/1912 | Germany. |
| 650,268 | 2/1951 | Great Britain. |

GERALD M. FORLENZA, *Primary Examiner.*

J. E. OLDS, *Assistant Examiner.*